Figure 1:
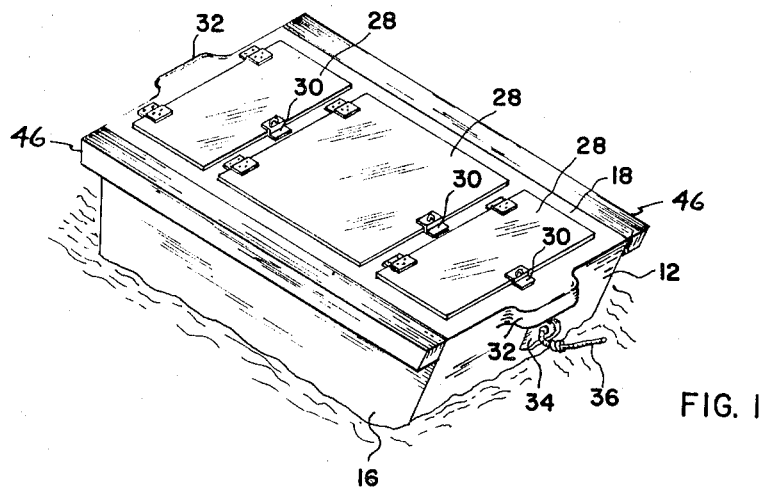

Feb. 21, 1967    R. D. HARDESTY ETAL    3,304,645
LIVE BAIT AND FISH CONTAINER
Filed Nov. 12, 1964

INVENTORS.
RICHARD D. HARDESTY
THOMAS J. MORELAND
BY Hauke + Hauke

United States Patent Office 3,304,645
Patented Feb. 21, 1967

3,304,645
LIVE BAIT AND FISH CONTAINER
Richard D. Hardesty, 2900 Gibson, Muskogee, Okla. 74401, and Thomas J. Moreland, 19724 Pine, Tulsa, Okla. 74138
Filed Nov. 12, 1964, Ser. No. 410,676
4 Claims. (Cl. 43—55)

The present invention relates to fishing apparatus and more particularly to an improved container for live bait and fish which may be utilized to carry live bait and/or fish to and from a fishing site and which may be employed to maintain the live bait and fish within fresh water while fishing and if a boat is used during movement of the boat.

Heretofore many different types of live bait and fish containers have been proposed. None of these have met the need for a container which can be used for transporting live bait and/or fish to and from the fishing site, which can be positioned in the water at the fishing site to fill with fresh water, and which can be readily towed behind a boat without producing undue drag on the boat and without permitting water to forcefully enter the container to cause harm to the bait or fish contained therein.

Patent No. 2,657,496 issued to R. E. L. Spotswood on November 3, 1953, discloses a container adapted to be towed behind a boat. Unlike the container which will be hereafter disclosed the box of the patent disclosure cannot be used to carry live bait and/or fish to and from the fishing site because it is provided with sides and a bottom of perforated construction. Further, when the container is not being pulled behind a boat it will completely sink in the water and must be retrieved and partially emptied prior to moving the boat.

Similarly Patent No. 1,619,634 issued to H. A. Roat on March 1, 1927, discloses a bait box intended to be fastened to a boat. Means are provided to insure that the box will not completely sink but again because of the perforated construction of the box it cannot be used for transporting purposes. Further, during movement of the boat the water forcefully entering the container will tend to injure the bait and fish carried therein and will produce a severe drag on the moving boat.

The aforementioned patent disclosures while not exhaustive are representative of the bait boxes which have heretofore been in use. None of the prior art devices have provided a construction which permits the container to be used to transport live bait and/or fish in water to and from the fishing site and yet in which the container can be dropped into the water at the fishing site where it will float and water will be circulated through it.

The present invention provides a container for live bait and/or fish which may if desired be completely or partially filled with water for transporting live bait and/or fish to and from the fishing site. If desired portions only of the box can be provided with water permitting dry compartments to be used for transporting other fishing apparatus. Once at the fishing site the box can be put into the water and be permitted to fill partially or completely with fresh water. If filled completely the box will still float since means are provided for this purpose. If the box is secured to a boat and it is desired to move the boat this can be done without disturbing the box. Means are provided to partially empty the container during movement so that an undue drag on the boat is prevented. Water is prevented from entering the container during movement of the boat so that the bait and/or fish will not be harmed or injured.

It is an object then of the present invention to improve live bait and/or fish containers by providing such a container to produce all of the aforementioned advantages.

It is another object of the present invention to increase the versatility of live bait and/or fish containers by providing such a container provided with compartments and means permitting the compartments to be individually partially filled with water so that dry compartments can be used to transport other fishing apparatus.

It is still another object of the present invention to improve live bait and/or fish containers of the type adapted to be towed behind a boat by providing such a container with means preventing the containers from sinking and means automatically draining a portion of the water filling the container as the container is being pulled through the water.

Figure 2:
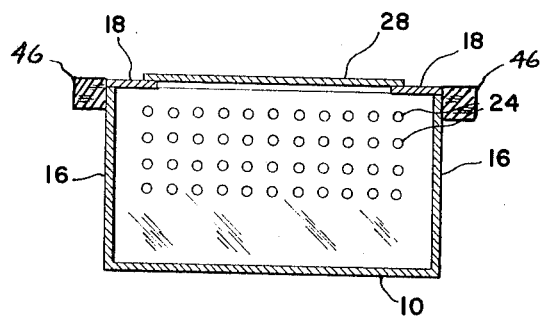
Figure 3:
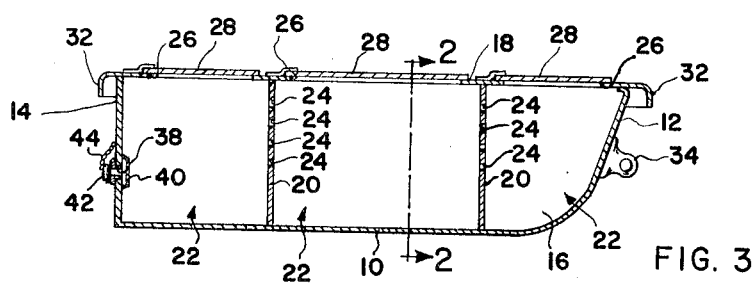
Figure 4:
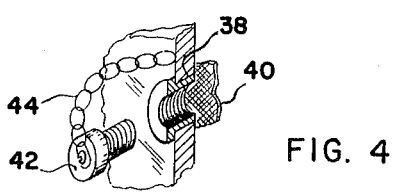

Still further objects and advantages of the present invention will readily occur to one skilled in the art to which the invention pertains upon reference to the following drawings in which like reference characters refer to like parts throughout the several views and in which, FIG. 1 is a perspective view of a preferred container of the present invention, FIG. 2 is a transverse cross-sectional view of the container illustrated in FIG. 1 and taken substantially on line 2—2 of FIG. 3, FIG. 3 is a longitudinal cross-sectional view of the container shown in FIG. 1, and FIG. 4 is a fragmentary enlarged detail view of a portion of the structure illustrated in FIG. 3.

Now referring to the drawings for a more detailed description of the present invention, a preferred live bait and fish container is therein illustrated as comprising a bottom 10 which is curved upwardly and forwardly to form a front portion 12. A rear wall 14 is secured to the rear edge of the bottom 10 and extends vertically upwardly therefrom as can best be seen in FIG. 3. Secured to the bottom 10, the front portion 12 and the rear wall 14 are a pair of spaced vertically extending side walls 16. A top panel 18 is secured to the upper edges of front portion 12, the rear wall 14 and the side walls 16.

A plurality of spaced partition walls 20 are secured at their horizontally extending edges to the bottom 10 and the top panel 18 and at their vertically extending edges to the side walls 16. The partition walls 20 thus divide the interior of the container into a plurality of individual compartments 22. Each of the partition walls 20 is provided with a plurality of spaced apertures 24 which permit water to flow between the compartments 22. The apertures 24, however, are all disposed in the partition walls 20 above a line spaced from the bottom 10 so that when the water level in the compartments 22 is below the lowermost apertures 24 there is no water transfer between the compartments 22.

The top panel 18 is preferably provided with a plurality of openings 26, preferably one for each of the compartments 22. The openings 26 are preferably closed by hingedly mounted doors 28. Latch means 30 may if desired be provided for each of the doors 28. The top panel 18 is further formed to provide a handle 32 at each end of the container so that it may be readily lifted and carried about.

The front portion 12 is preferably formed with an eye member 34 so that the container can be secured to a boat (not shown) by a rope 36 or similar means.

The rear wall 14 is provided with an opening 38 which is preferably disposed substantially co-planar with the lowermost apertures 24 provided in the partition walls 20. As can best be seen in FIG. 4, a screen 40 is disposed across the opening 38 and a plug member 42 is provided for closing the opening 38. For preventing the plug member 42 from becoming lost when it is removed from the opening 38 a chain 44 or similar fastening means may be provided to fasten the plug member 42 to the rear wall 14.

To insure that the container will float even when completely filled with water elongated blocks 46 of a suitable buoyant material are affixed to the upper portions of the side walls 16.

It is apparent that the container of the present invention may be readily carried to and from the fishing site by using the handles 32. To transport live bait to the fishing site one or more of the compartments 22 may be partially filled with water. If it is desired to use the container for carrying other fishing apparatus as well, the compartments 22 holding the live bait will be filled to a level below the apertures 24 so that the other compartments 22 will be dry.

Once at the fishing site and with the fishing apparatus removed the container is placed in the water with the plug member 42 removed from the opening 38. This will permit the container to completely fill with fresh water. The blocks 46 will maintain the container afloat so that the compartments 22 can be easily reached by the doors 28. The apertures 24 provided in the partition walls 20 and the screened opening 38 will permit the fresh water to circulate throughout the container without permitting the live bait and any fish which may be caught from escaping either from the individual compartments 22 or from the container itself.

If a boat is being used the container of course will be secured to the boat by the eye member 34 and the rope 36. When it is desired to move the boat nothing need be done to the container of the present invention. As the boat is being moved water will be discharged from the container through the opening 38 to partially empty the container and to permit it to plane across the water so that no undue drag is produced on the boat and to reduce the stress on the rope 36. The water level within the container even during movement will not be reduced much below the level of the lowermost apertures 24 so that any bait or fish within the container will have sufficient water to sustain them until the new fishing site is reached. Since no water can come into the container during movement there is no danger of injury to the fish or bait contained therein.

It is also apparent that although we have described but one embodiment of our invention many changes and modifications can be made therein without departing from the spirit of the invention as expressed by the appended claims.

We claim:

1. A container for live bait and fish comprising, (a) an enclosed box comprising a bottom wall, side walls, a front wall, a rear panel, and a top panel, all of said walls being completely imperforate,
   (b) at least one partition wall extending vertically upwardly from said bottom wall and having a horizontally extending edge secured to said top panel and vertically extending edges secured to said side walls to divide the interior of said box into a plurality of compartments,
   (c) said partition wall being provided with a plurality of apertures with all of said apertures being positioned above a line substantially parallel with and spaced from said bottom wall whereby an imperforate portion of said partition wall is provided adjacent said bottom wall,
   (d) an opening being provided in said rear panel, a screen member covering said opening, and means for selectively closing said opening, and
   (e) means for securing a towing rope to said front wall.

2. The container as defined in claim 1 and in which said opening is disposed substantially co-planar with the lowermost of said apertures provided in said partition wall.

3. The container as defined in claim 1 and including door members provided in said top panel with one of said door members opening to each of said compartments.

4. The container as defined in claim 1 and including buoyant means secured to each of said side walls adjacent said top panel.

References Cited by the Examiner

UNITED STATES PATENTS

| | | | |
|---|---|---|---|
| 1,576,688 | 3/1926 | Thompson | 43—55 |
| 1,619,634 | 3/1927 | Roat | 43—55 |
| 1,731,191 | 10/1929 | De Roy | 43—55 |
| 2,657,496 | 11/1953 | Spotswood | 43—55 |
| 2,765,577 | 10/1956 | Scruggs | 43—55 |
| 2,854,782 | 10/1958 | Daugherty | 43—55 |
| 2,885,819 | 5/1959 | Newell et al. | 43—55 |
| 3,045,262 | 7/1962 | Mitchell | 43—55 X |

SAMUEL KOREN, *Primary Examiner.*

D. J. LEACH, *Assistant Examiner.*